UNITED STATES PATENT OFFICE.

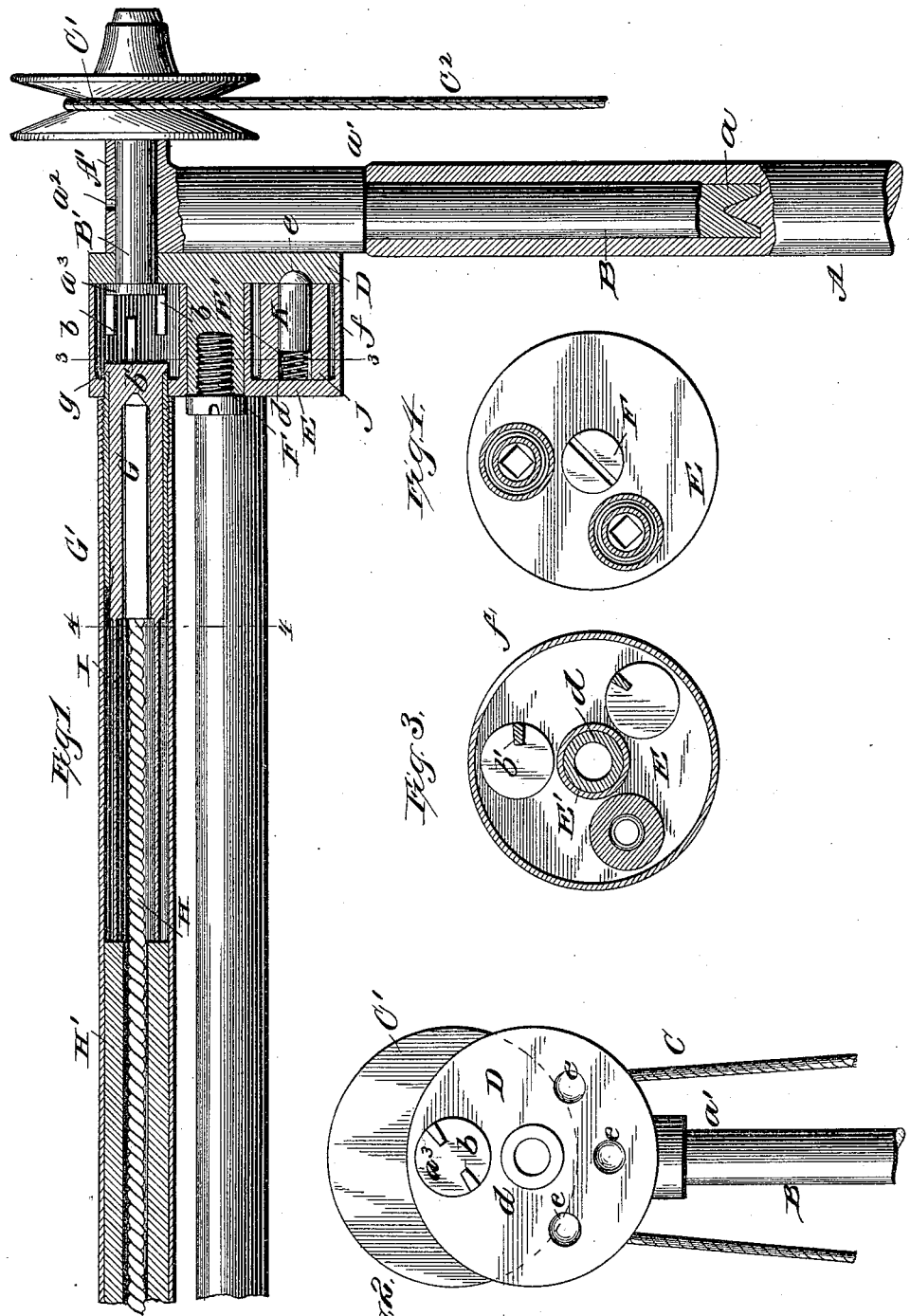

JAMES THOMAS CALVERT, OF SPARTANBURG, SOUTH CAROLINA.

DENTAL ENGINE.

SPECIFICATION forming part of Letters Patent No. 463,855, dated November 24, 1891.

Application filed June 4, 1891. Serial No. 395,085. (No model.)

*To all whom it may concern:*

Be it known that I, JAMES THOMAS CALVERT, a citizen of the United States, residing at Spartanburg, in the county of Spartanburg, State of South Carolina, have invented certain new and useful Improvements in Dental Engines, of which the following is a specification, reference being had therein to the accompanying drawings.

This invention relates to certain new and useful improvements in dental engines, and more particularly to pulley-heads therefor.

It has for its objects, among others, to provide a simple and improved construction whereby a plurality of cables can be attached and operated from the one head, so that an operator can have a plurality of different instruments handy for use and not have to stop the engine and change instruments, thus effecting a material saving in time. I provide a plate carried by the spindle, and in which the pulley-shaft has a bearing, and a movable plate sleeved upon the stud of the said plate and carrying the pulleys and their accessories. Suitable means are provided for holding the desired pulley in operative contact with the pulley-shaft and its connections when adjusted thereto.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a view, partly in section and partly in side elevation, showing my improvements applied to a dental engine, sufficient parts of the engine being shown for the proper understanding of my invention. Fig. 2 is an end view looking at the plate on the spindle with the other parts removed. Fig. 3 is a cross-section on the line 3 3 of Fig. 1. Fig. 4 is a cross-section on the line 4 4 of Fig. 1.

Like letters of reference indicate like parts throughout the several views in which they occur.

Referring now to the details of the drawings by letter, A designates the upright or standard of an ordinary dental engine and provided with a socket $a$ for the spindle B of the pulley-head. This spindle is formed with a shoulder $a'$, as seen in Fig. 1, and the portion of the spindle above this shoulder is extended horizontally, as shown at A', to form a bearing for the pulley-shaft B', on the outer end of which is carried the pulley C', of any known or approved form of construction and adapted to be driven by belt or band $C^2$, driven in the usual manner.

D is a disk or plate securely affixed to or fast upon the upper part of the spindle, and through which the pulley-shaft projects and has a bearing, as shown in Fig. 1. Suitable means may be provided for oiling the journal—as, for instance, a hole $a^2$, as seen in Fig. 1. The pulley-shaft is provided with a head $a^3$ within the plate or disk D, as seen in Fig. 1, to prevent its accidental withdrawal, and also with fingers or points $b$, adapted to engage with a point $b'$ to actuate the cable, as hereinafter described. The disk or plate D has a central stud $d$, as shown more clearly in Fig. 1, and is provided upon its inner face with a plurality of depressions or countersinks $e$, as shown in Figs. 1 and 2, for engaging and receiving the spring-actuated bolt, hereinafter described.

E is the front plate. It is provided with a central sleeve E', which is sleeved upon the stud $d$ of the rear plate, as seen in Fig. 1, and this front plate is held in position by means of the screw F engaging the threads of a socket in the stud $d$ of the rear plate, as shown best in Fig. 1, so that the front plate may be revolved on the stud when desired. The front plate has a surrounding flange $f$, as seen in Fig. 1, to inclose the parts hereinafter described. There are two or more cable-carrying devices. As each is substantially the same, I shall describe only one and have shown the same in section in Fig. 1.

G is the revolving socket, provided with a cap $g$ on the inner end thereof and carrying the point $b'$, hereinbefore referred to, and which is engaged by the points $b$ on the pulley-shaft.

G' is a sleeve secured to the front plate and surrounding and supporting the socket.

H is the cable attached to the revolving socket and provided with a flexible covering H' of any preferred material and form of construction, and I is a protecting-sleeve screwed onto the sleeve G', as seen in Fig. 1.

Upon the inner face of the front plate is a boss J, in the bore of which works a spring-actuated bolt K, with a rounded outer end, and adapted to engage any one of the depressions or countersinks e in the rear plate, as seen in Fig. 1.

The operation will be readily understood. As shown in Fig. 1, the device is ready for operating the cable, the operating devices of which are shown in position to be operated by the revolution of the pulley-shaft in the usual way. Supposing the operator desires to use another tool from the one carried by that cable, ordinarily he would have to stop the machine, remove the tool, and place the other one in the holder and then proceed. With my improvement all that it is necessary to do is to revolve the front plate on its pivot until the cap attached to the socket carrying the desired tool comes opposite the pulley-shaft, when the spring-actuated bolt springs into the depression in the rear plate and holds the parts in place. Another partial turn will bring another one into operative position. The bolt automatically springs into the depression, and yet, owing to its rounded end, it permits of the turning of the front plate when desired.

Various modifications in detail may be resorted to without departing from the spirit of the invention or sacrificing any of its advantages.

What I claim as new is—

1. A pulley-head for dental engines, provided with a plurality of cable-operating devices, as set forth.

2. A pulley-head for dental engines, having a rotatable portion carrying a plurality of cable-rotating sockets and means for holding the rotatable portion in its adjusted position, as set forth.

3. The combination, with the standard and the pulley-shaft, of the rear plate, the front plate rotatable thereon, and the plurality of cable-carrying sockets arranged to be independently actuated from the pulley-shaft, as set forth.

4. The combination, with the standard and the pulley-shaft, of the fixed rear plate having depressions, the rotatable front plate having a spring-actuated bolt, and a plurality of independently-operating cable-rotating devices, all substantially as specified.

5. The combination, with the standard and the rear plate, of the pulley-shaft having a bearing in the said plate and carrying the points or fingers, the rotatable front plate having a flange and a plurality of cable-rotating devices each provided with a point to engage the points of the pulley-shaft, and a spring-actuated retainer for the front plate, as set forth.

In testimony whereof I affix my signature in presence of two witnesses.

JAMES THOMAS CALVERT.

Witnesses:
GEO. W. NICHOLLS,
GEO. E. LADSHAM.